United States Patent
Balal et al.

(10) Patent No.: US 11,945,725 B1
(45) Date of Patent: Apr. 2, 2024

(54) SYNTHESIS OF ACTIVATED CARBON USING PALM LEAVES AND POTASSIUM PERMANGANATE

(71) Applicant: KING FAISAL UNIVERSITY, Al-Ahsa (SA)

(72) Inventors: Samah Babiker Daffalla Balal, Al-Ahsa (SA); Arwa Abdulhameed Al Amer, Riyadh (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/529,402

(22) Filed: Dec. 5, 2023

(51) Int. Cl.
| | | |
|---|---|---|
| *C01B 32/348* | (2017.01) | |
| *B01J 20/20* | (2006.01) | |
| *B01J 20/30* | (2006.01) | |
| *B01J 20/32* | (2006.01) | |
| *C01B 32/318* | (2017.01) | |
| *C02F 1/28* | (2023.01) | |
| *C02F 101/20* | (2006.01) | |
| *C02F 101/30* | (2006.01) | |

(52) U.S. Cl.
CPC ............. *C01B 32/348* (2017.08); *B01J 20/20* (2013.01); *B01J 20/3021* (2013.01); *B01J 20/3071* (2013.01); *B01J 20/3078* (2013.01); *B01J 20/3085* (2013.01); *B01J 20/3214* (2013.01); *C01B 32/318* (2017.08); *B01J 20/324* (2013.01); *C02F 1/281* (2013.01); *C02F 1/283* (2013.01); *C02F 2101/20* (2013.01); *C02F 2101/308* (2013.01)

(58) Field of Classification Search
None
See application file for complete search history.

(56) References Cited

FOREIGN PATENT DOCUMENTS

| | | |
|---|---|---|
| CN | 106082214 A | 11/2016 |
| CN | 113856622 A | 12/2021 |
| CN | 115055160 A | 9/2022 |
| KR | 100666311 B1 | 1/2007 |

OTHER PUBLICATIONS

Mopoung et al. (J. Eng. Applied Sci., 2020, 15, 421-429). (Year: 2020).*
Mopoung et al. (Asian Journal of Scientific Research, 2019, 12, 126-136). (Year: 2019).*
Zheng et al. (Journal of Applied Pyrolysis, 2021, 158, 105269). (Year: 2021).*
Aloud et al. (Water, 2023, 15, 3905). (Year: 2023).*
Abbas et al. (Mol Bio, 2023, 12:1, pp. 1-8). (Year: 2023).*
Ghany et al. (International Journal of Engineering Technologies and Management Research, 2019, 6, 34-43). (Year: 2019).*
Chanpee et al. (Molecules, 2022, 27, 5309). (Year: 2022).*
Khurshid et al. (Sustainability, 2022, 14, 1986) (Year: 2022).*
El-Shafey et al. (Journal of Environmental Chemical Engineering, 2016, 4, 2713-2724). (Year: 2016).*
Aljeboree et al. (IJPQA, 2023, 14, pp. 12-16). (Year: 2023).*
Elhussein et al. (American Journal of Physical Chemistry, 2017, 6, 59-69). (Year: 2017).*
Islam et al. (Int. J. of Thermal & Environmental Engineering, 2022, 19, 87-92). (Year: 2022).*
Kyaw et al. (Chemical Engineering and Processing—Process Intensification, 2021, 108311). (Year: 2021).*
Maulina et al. (IOP Conf. Series: Materials Science and Engineering, 2018, 309, 012072). (Year: 2018).*
Younes et al. (American Journal of Analytical Chemistry, 2022, 13, 331-345). (Year: 2022).*
El-Gendy et al. (Carbohydrate Polymers, 2013, 96, 481-486). (Year: 2013).*
Godiya et al. (Emerging Techniques for the Treatment of Toxic Metals from Wastewater: Chapter 4: Plant leaves waste for removal of metal ions, 2023, pp. 47-81). (Year: 2023).*
Mopoung, et al. "Potassium permanganate loaded activated carbon production from pineapple leaf at low pyrolysis temperature for water hardness removal" Asian Journal of Scientific Research 12 (2019): 126-136.
Zheng, et al. "Insight into the KOH/KMnO4 activation mechanism of oxygen-enriched hierarchical porous biochar derived from biomass waste by in-situ pyrolysis for methylene blue enhanced adsorption", Journal of Analytical and Applied Pyrolysis 158 (2021): 105269.
Khurshid, et al. "Modified Activated Carbon Synthesized from Oil Palm Leaves Waste as a Novel Green Adsorbent for Chemical Oxygen Demand in Produced Water", Sustainability 14.4 (2022): 1986.
Chanpee, et al.. "Nanoporous Carbon from Oil Palm Leaves via Hydrothermal Carbonization-Combined KOH Activation for Paraquat Removal", Molecules. Aug. 19, 2022;27(16):5309.
Tawatbundit, et al. "Activated Carbon Preparation from Sugarcane Leaf via a Low Temperature Hydrothermal Process for Aquaponic Treatment", Materials 15.6 (2022): 2133.
Mopoung, et al., "Production of KMnO4 Loaded Activated Carbon from Sacha Inchi Seed Shell by Low Activation Temperature Treatment for Methylene Blue Removal", Journal of Engineering and Applied Sciences 15 (2): 421-429, 2020.

* cited by examiner

*Primary Examiner* — Clare M Perrin
(74) *Attorney, Agent, or Firm* — Nath, Goldberg & Meyer; Richard C. Litman

(57) ABSTRACT

A method of preparing an activated charcoal can include obtaining palm leaves; grinding the palm leaves; refluxing the ground palm leaves with sodium hydroxide (NaOH) to obtain a basic solution; draining the basic solution from the palm leaves; washing and drying the ground palm leaves; refluxing the dried ground palm leaves with potassium permanganate ($KMnO_4$) to obtain a reaction mixture; heating the reaction mixture; washing the reaction mixture with hydrochloric acid (HCl); and drying the reaction mixture to obtain activated carbon. A method of removing a pollutant from an aqueous solution includes contacting the activated carbon as prepared in with the aqueous solution to remove organic dyes.

13 Claims, No Drawings

SYNTHESIS OF ACTIVATED CARBON USING PALM LEAVES AND POTASSIUM PERMANGANATE

BACKGROUND

1. Field

The present disclosure provides a method for preparing activated carbon, and particularly, to activated carbon made using palm leaves and potassium permanganate ($KMnO_4$).

2. Description of the Related Art

Organic dyes that are disposed in natural waters may cause health side effects for human and/or aquatic life. Dyes, when discharged into receiving streams, can generally cause detrimental effects on the liver, gill, kidney, intestine, gonads, and pituitary gonadotrophic cells of aquatic life. In humans, they may cause irritation to the respiratory tract if inhaled, and irritation to the gastrointestinal tract if ingested. Contact of dyes with skin and eyes may cause irritation with redness and even permanent injury.

Other common organic wastewater pollutants include pharmaceuticals and personal care products, such as antibiotics (e.g., ciprofloxacin, levofloxacin, sulfamethoxazole) often found in surface waters and veterinary pharmaceuticals that enter the water via manure dispersion and animal excretion onto soils. Antibiotics in natural waters contribute to the spread of antibiotic resistance in microorganisms.

Since most organic dyes have high water solubility, they are generally difficult to remove by usual waste-treatment systems.

Activated carbon (AC) is a carbonaceous substance with an amorphous structure that has a high degree of porosity and a well developed surface area. Carbonization and activation are basic procedures for production of AC. There are several factors that can affect the activation process, including the type of activating agent used (acid, base, or neutral), impregnation ratio, and heating method. AC is often created from limited resources such as coal, lignite, peat, and petroleum residual materials, which are costly and need extensive regeneration.

The rising demand and needs have resulted in the development of less expensive, more environmentally friendly, and more sustainable materials for the manufacturing of AC, from the thermal treatment of biomass. The cellulose-based material derived from agriculture waste has recently been identified. Because of its affordability, abundance, and sustainability, cellulose has long been regarded as a suitable resource for organic synthesis. The use of agriculture waste also has the potential to help long-term green growth.

Thus, an efficient, rapid, cost-effective, and environmentally friendly method for preparing an adsorbent for removal of pollutants from aqueous media is needed.

SUMMARY

The present subject matter relates to a method of preparing activated carbon adsorbent from palm leaves. The adsorbent, for example, adsorbent flakes, can be used for enhanced removal of pollutants from wastewater.

As described herein, a novel activated carbon or charcoal (AC) can be produced from palm leaves using potassium permanganate ($KMnO_4$) as a neutral activating agent at 600° C. for 1 h (PL-NAC). The oxidation of dyes from aqueous solutions by the developed AC and hydrogen peroxide was studied. Methylene blue (MB), Methyl orange (MO), Malachite green (MG), Congo red (CR) were used as model dyes. The surface characteristics of the AC were investigated using FTIR. Preliminary results showed that at normal pH, the produced activated carbon (PL-NAC)/$H_2O_2$ degrade MB, and MG dyes from an aqueous solutions with a removal efficiency equal to 99.9% in few seconds, while the removal efficiency of MO and CR was 75%, and 53% respectively. This demonstrates that the activating palm leaves with $KMnO_4$ can form a novel activated carbon for the fast removal of dyes from aqueous solutions.

In one embodiment, the present subject matter relates to a method of preparing an activated carbon from palm leaves that can include obtaining palm leaves; grinding the palm leaves to obtain ground palm leaves; refluxing the ground palm leaves with sodium hydroxide (NaOH) to obtain a basic solution; draining the basic solution from the ground palm leaves to obtain drained ground palm leaves; washing and drying the drained ground palm leaves to obtain dried ground palm leaves; refluxing the dried ground palm leaves with potassium permanganate ($KMnO_4$) to obtain a dry reaction mixture; heating the dry reaction mixture to obtain a heated dry reaction mixture; washing the heated dry reaction mixture with hydrochloric acid (HCl) to obtain washed samples; and drying the washed samples to obtain activated carbon.

In an embodiment, the NaOH may have a concentration of 1 molar (M). In an embodiment, refluxing the palm leaves may reduce an ash content in the palm leaves.

In an additional embodiment, the present subject matter relates to activated carbon prepared by the methods discussed herein.

In another embodiment, the present subject matter is directed to a method of removing a pollutant from an aqueous solution comprising contacting the aqueous solution with the activated carbon. In an embodiment, the pollutant can include an organic dye. In another embodiment, the pollutant can include ions.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps. It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of preparing activated carbon from palm leaves. The activated carbon can be used for enhanced removal of pollutants from wastewater.

In one embodiment, the present subject matter relates to a method of preparing an activated carbon from palm leaves that can include obtaining palm leaves; grinding the palm leaves to obtain ground palm leaves; refluxing the ground palm leaves with sodium hydroxide (NaOH) to obtain a basic solution; draining the basic solution from the ground palm leaves to obtain drained ground palm leaves; washing and drying the drained ground palm leaves to obtain dried ground palm leaves; refluxing the dried ground palm leaves with potassium permanganate ($KMnO_4$) to obtain a dry reaction mixture; heating the dry reaction mixture to obtain a heated dry reaction mixture; washing the heated dry reaction mixture with hydrochloric acid (HCl) to obtain washed samples; and drying the washed samples to obtain activated carbon.

In an embodiment, the NaOH may have a concentration of 1 molar (M). In another embodiment, refluxing the ground palm leaves with NaOH may reduce the ash content of the palm leaves/ground palm leaves.

In an embodiment, the drained ground palm leaves may be dried at about 70° C. In another embodiment, the drained ground palm leaves may be dried for about 24 hours.

In an embodiment, the dried ground palm leaves can be refluxed with $KMnO_4$ using a dry method. In this regard, the dried ground palm leaves may be refluxed with $KMnO_4$ at about a 1:1 impregnation ratio, by weight or mass. In another embodiment, the dry reaction mixture may be heated in a furnace with limited oxygen. In this regard, the dry reaction mixture may be heated at about 550° C. to 650° C., or about 600° C. for at least about 1 hour, or about 1 hour.

In an embodiment, the heated dry reaction mixture may be washed with 1M HCl for about at least 1 hour, or about 1 hour, at room temperature. In this regard, washing the heated dry reaction mixture with HCl may remove impurities from the heated dry reaction mixture. In a further embodiment, the washed samples may be dried at about 65° C. to about 75° C., or about 70° C. The washed samples may be dried for at least about 24 hours, or about 24 hours.

In some embodiments, the activated charcoal/activated carbon may be obtained in about a 46.03% yield from the palm leaves. Accordingly, the present subject matter further relates to activated charcoal and/or activated carbon produced according to the methods described herein. In certain embodiments in this regard the activated charcoal and/or activated carbon can be produced as adsorbent flakes.

In an embodiment, the activated carbon can be contacted with an aqueous solution to remove a pollutant therefrom. In another embodiment, the pollutant can be an organic dye, such as Congo red, Methylene blue, malachite green, Rhodamine B, bromophenol blue, rose Bengal dyes, Alizarin red, Indigo carmine, and mixtures thereof. In a particular embodiment, the organic dye includes one or more of Methylene blue (MB), Malachite green (MG), Congo red (CR), and Methyl orange (MO). In an embodiment, the pollutant can be present as ions.

In an additional embodiment, the activated charcoal described herein, whether used as adsorbent flakes or otherwise, can be used to remove cations, anions, and/or heavy metal ions from a liquid, for example, from wastewater.

The following examples illustrate the present teachings.

EXAMPLES

Example 1

Preparation of Activated Charcoal

The process of conversion of palm leaves to an activated charcoal with reduced ash content was conducted using the following steps.

Material: The palm leaves (PL) were collected from a local farm in Al-Ahsa, Saudi Arabia. Sodium potassium permanganate ($KMnO_4$), hydrochloric acid (HCl), and sodium hydroxide (NaOH) were used for the production of Activated Charcoal. Methylen blue (98% MB), Malachite green (98% MG), Congo red (98% CR), Methyl orange (98% MO) were used to evaluate the oxidation process. All the chemicals were purchased from Merck.

Preparation of Activated Carbon using neutral activating agent: For neutral activation, the grinded palm leaves were refluxed with 1M NaOH solution for 1 hour to reduce ash content in the sample. After the basic solution was drained, the palm leaves were washed and then dried at 70° C. for 24 hours. Subsequently, the palm leaves were refluxed with $KMnO_4$ using dry method at impregnation ratio (1/1, mass ratio of activating agent to dried palm leaves). Then the mixture was heated in a furnace with limited oxygen at 600° C. for 1 h. Finally, the activated carbon was washed with 1M HCL at room temperature for one hour to remove the impurities. The washed samples were dried at 70° C. for 24 hours. The developed AC was named PL-NAC.

Example 2

FT-IR Characterization

FT-IR analysis of feedstock and the developed activated charcoal (PL-Na/AC) was conducted. For palm leaves, the presence of the bands at 3276, 2916, 1618, 1375, 1238, 1020, 873, and 757 $cm^{-1}$ specifically can be applied to hydroxyl, olefin, esters, and ether groups. In contrast, for the PL-NAC sample, a band at 3400-2000 cm shows a decrease in relative intensity, primarily due to carboxyl group destruction. Moreover, for the PL-NAC sample, a peak around (1090-1010 $cm^{-1}$) disappeared, likely as a result of palm leaf surfaces being cleaned of inorganic materials after treatment (Gao et. al., 2020, Singh et. al., 2017). The AC sample illustrated that the strong absorption bands at 1364 cm indicated the existence of specified aromatic C—H and carboxyl-carbonated was increased compared to the palm leaves.

Example 3

Effects of Properties of Activated Carbons in Oxidation Process

It was found that, at normal pH, the PL-NAC/$H_2O_2$ degrade MB, and MG dyes from aqueous solutions with removal efficiency equal to 99.9% in few seconds, while the removal efficiency of MO and CR was 75%, and 53% respectively. The effect of $H_2O_2$ doses of 0.1 and 0.5M on oxidation of dyes was studied. It was found that the dyes removal percentage was almost the same at both doses of $H_2O_2$, except for MO dye, for which a slight decrease in removal percentage was observed at 0.5M $H_2O_2$.

The activated charcoal as described herein were directly placed in polluted water. The porous adsorbent starts adsorbing the dye and reduces the pollutant content inside the water.

It is to be understood that the method for preparing an activated charcoal from palm leaves, and the resultant product and uses thereof, are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing an activated carbon from palm leaves, comprising:
   obtaining palm leaves;
   grinding the palm leaves to obtain ground palm leaves;
   refluxing the ground palm leaves with sodium hydroxide (NaOH) to obtain a basic solution;
   draining the basic solution from the ground palm leaves to obtain drained ground palm leaves;
   washing and drying the drained ground palm leaves to obtain dried ground palm leaves;
   refluxing the dried ground palm leaves with potassium permanganate ($KMnO_4$) to obtain a dry reaction mixture;
   heating the dry reaction mixture to obtain the activated carbon;
   washing the activated carbon with hydrochloric acid (HCl) to remove impurities; and
   drying the activated carbon.

2. The method of claim 1, wherein the NaOH has a concentration of about 1 molar (M).

3. The method of claim 1, wherein the drained ground palm leaves are dried at about 70° C.

4. The method of claim 1, wherein the drained ground palm leaves are dried for about 24 hours.

5. The method of claim 1, wherein the dried ground palm leaves are refluxed with $KMnO_4$ using a dry method.

6. The method of claim 1, wherein the dried ground palm leaves are refluxed with $KMnO_4$ at about a 1:1 impregnation ratio by weight.

7. The method of claim 1, wherein the dry reaction mixture is heated in a furnace with limited oxygen.

8. The method of claim 7, wherein the dry reaction mixture is heated at about 600° C.

9. The method of claim 7, wherein the dry reaction mixture is heated for about 1 hour.

10. The method of claim 1, wherein the activated carbon is washed with 1M HCl for about 1 hour at room temperature to remove impurities from the activated carbon.

11. The method of claim 1, wherein the washed activated carbon is dried at about 70° C. for about 24 hours.

12. The method of claim 1, wherein the washed activated carbon is dried for about 24 hours.

13. The method of claim 1, wherein the activated carbon is obtained in about a 46.03% yield.

* * * * *